June 24, 1930. W. DUPRÉ 1,766,015
CONVERTIBLE AUTOMOBILE BODY
Filed May 2, 1928 5 Sheets-Sheet 2
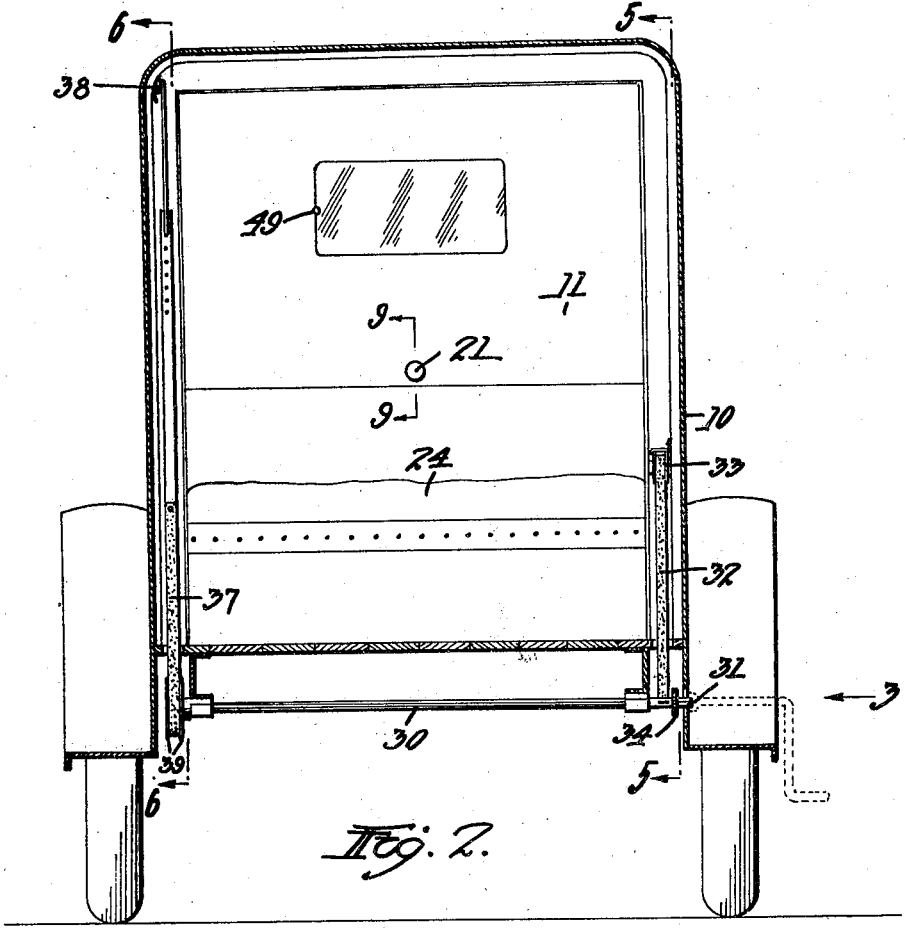
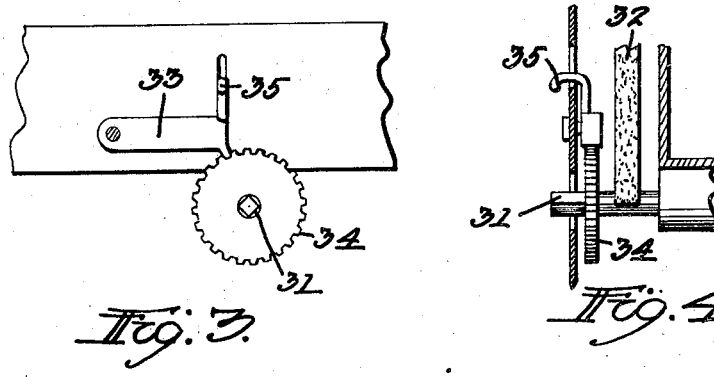
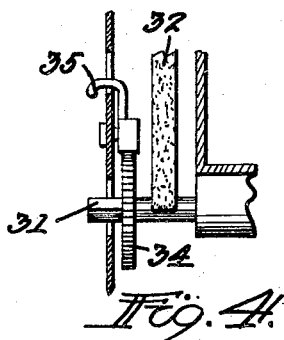
Inventor
Wilfred Dupré
By Attorneys

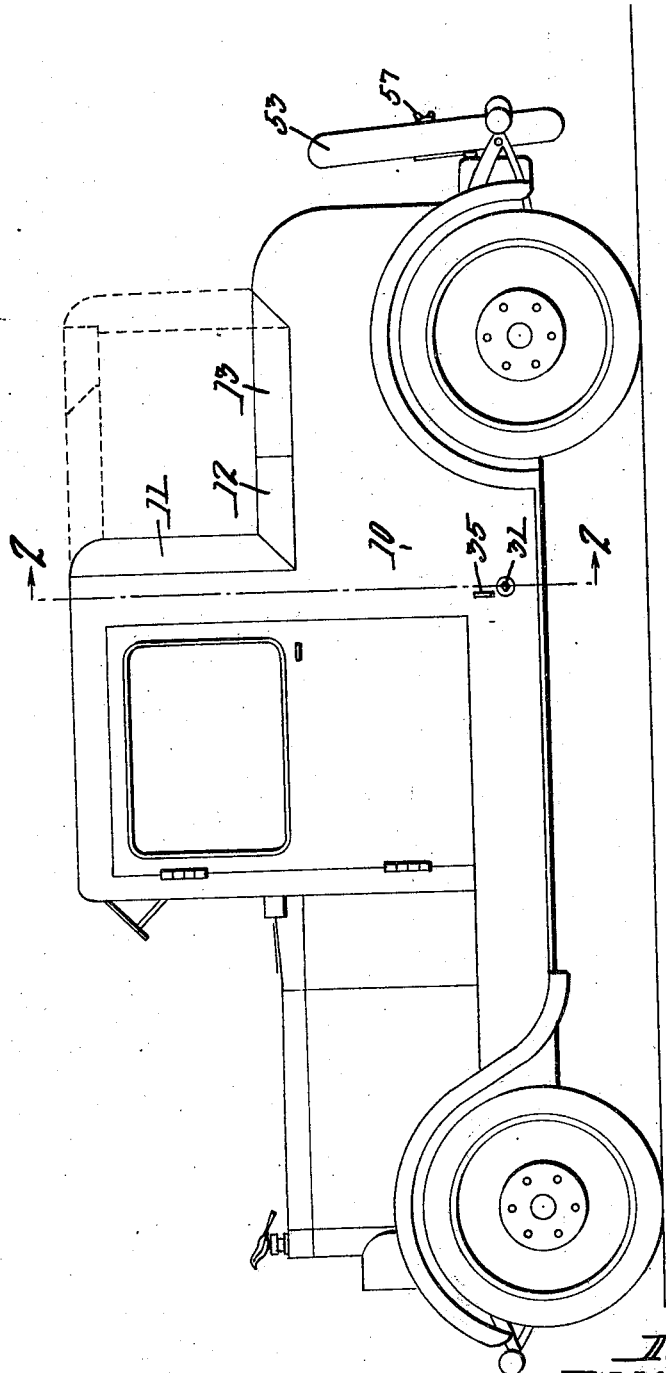

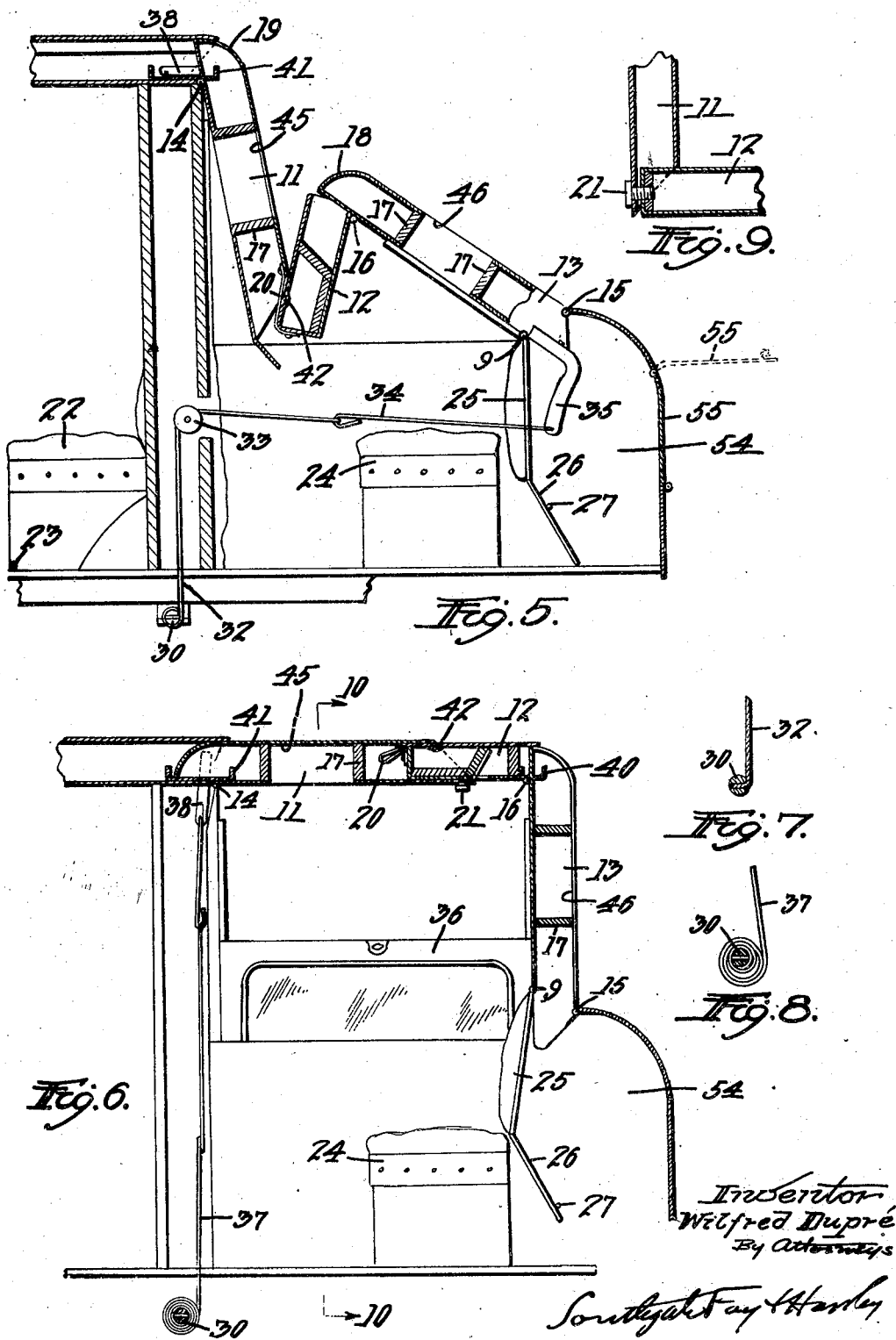

June 24, 1930. W. DUPRÉ 1,766,015
CONVERTIBLE AUTOMOBILE BODY
Filed May 2, 1928. 5 Sheets-Sheet 4
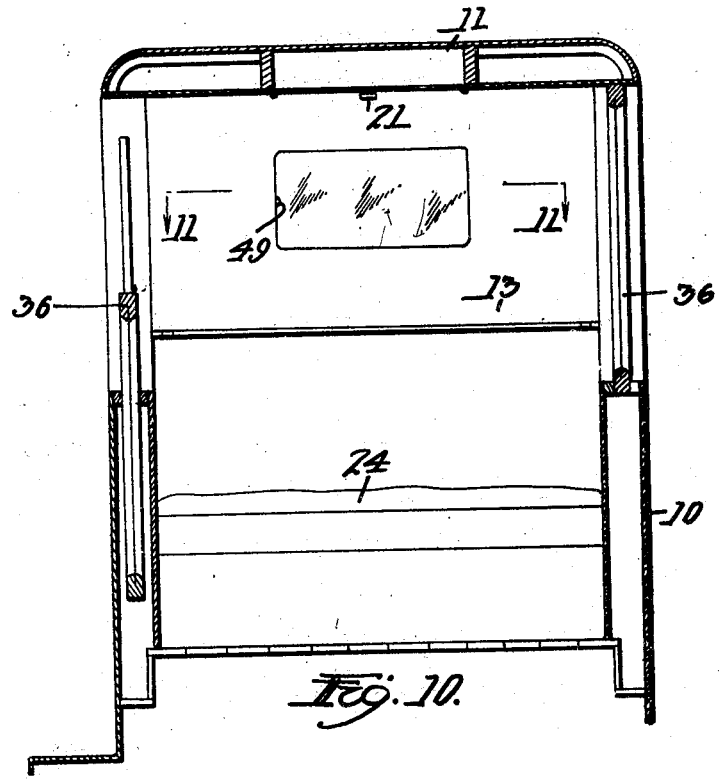
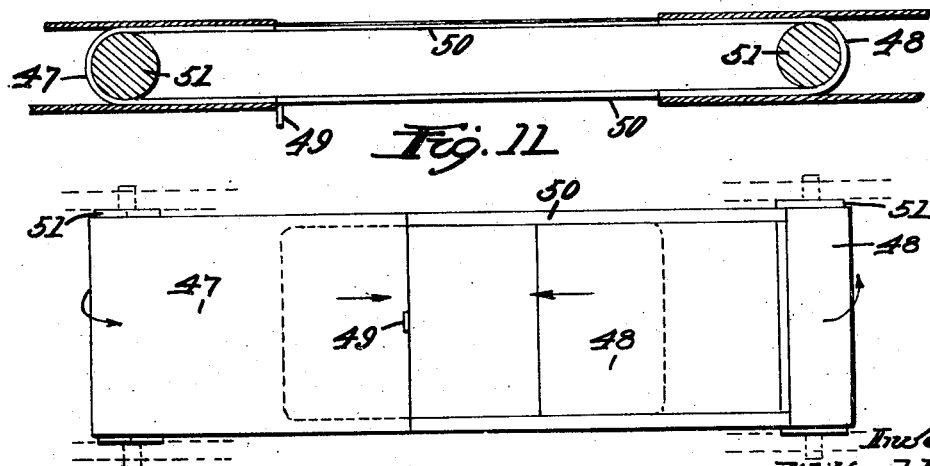

June 24, 1930.  W. DUPRÉ  1,766,015
CONVERTIBLE AUTOMOBILE BODY
Filed May 2, 1928  5 Sheets-Sheet 5

Inventor
Wilfred Dupré
By Attorneys
Southgate Fay & Hawley

Patented June 24, 1930

1,766,015

UNITED STATES PATENT OFFICE

WILFRED DUPRÉ, OF WORCESTER, MASSACHUSETTS

CONVERTIBLE AUTOMOBILE BODY

Application filed May 2, 1928. Serial No. 274,633.

This invention relates to the body of an automobile and the principal objects thereof are to provide a construction by which the body can be converted from a two-passenger coupé to a sedan or other closed automobile for five or more passengers, or vice versa, by the manipulation of a single element; to provide an operating means therefor preferably comprising two flexible members, both being arranged to be operated by a single shaft and adapted to be turned by a crank for moving the parts at the rear and top of the body for the purpose of making this quick change; to provide an arrangement of these operating means timed to actuate two of the movable elements at different rates of speed so that they will come into final position in the proper order; to provide the top of the rear portion of the coupé and the rear portion thereof in three elements so hinged together that, when moved to an extreme position, they constitute the vertical rear part and the horizontal part at the rear of the top of the sedan; to so curve their edges that they fit together in both positions to preserve the lines of both styles of car; to provide a single means for securely fastening the movable elements together in either position; to provide means for preventing leakage through the roof and rear in both positions of the parts; to provide a construction in which the back wall of the coupé and the top of the back are used to form the top and back of the rear compartment of the sedan; to provide windows in two of the movable elements, one to be used in each position of the parts to conceal the window that is not being used in a very simple manner; to provide means for holding the adjustable parts that constitute the changing elements and to provide a spare wheel support adapted to be moved to provide access to the back compartment for luggage.

Other objects and advantages of the invention will appear hereinafter.

Reference is to be had to the accompanying drawings in which

Fig. 1 is a side view of an automobile having a body constructed in accordance with this invention, showing two positions of the parts in full and dotted lines;

Fig. 2 is a vertical sectional view on the line 2—2 of Fig. 1;

Fig. 3 is an end view on enlarged scale of the means for operating the movable parts and the latch for holding them;

Fig. 4 is an edge view of the same showing the supporting bracket in section;

Figure 13:
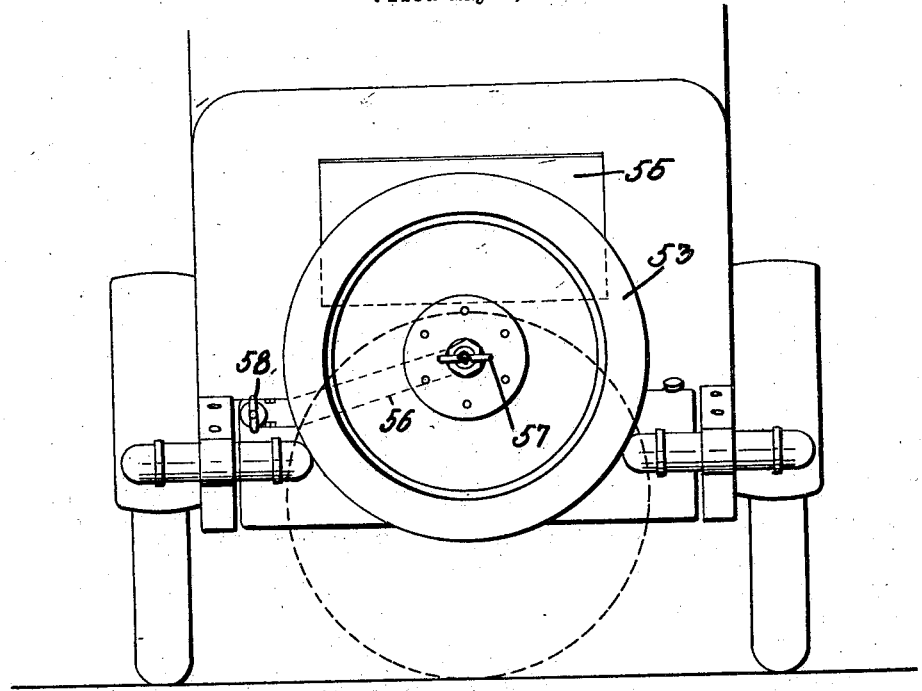
Figure 14:
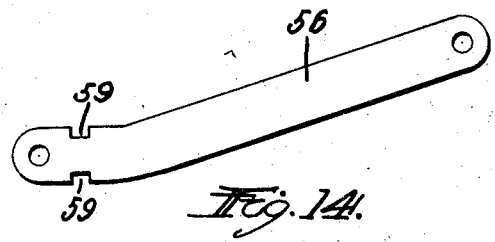
Figure 15:
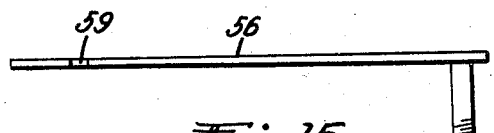
Figure 16:
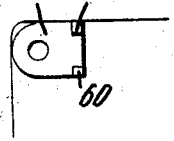

Figs. 5 and 6 are sectional views on the lines 5—5 and 6—6 of Fig. 2 respectively, showing the parts in two different positions;

Fig. 7 is a sectional view of the operating shaft showing the arrangement for manipulating the rear elements of the device;

Fig. 8 is a similar view showing the elements for manipulating the forward element;

Fig. 9 is a sectional view on the line 9—9 of Fig. 2, showing the fastening of the elements in the sedan position;

Fig. 10 is a vertical sectional view on the line 10—10 of Fig. 6;

Fig. 11 is a sectional view on the line 11—11 of Fig. 10;

Fig. 12 is a face view of the parts shown in Fig. 11, showing the shades for concealing the window half open;

Fig. 13 is a rear view of the car showing a spare wheel in position and indicating its displacement to provide access to the luggage carrier under the seat;

Fig. 14 is a rear view of the supporting arm therefor;

Fig. 15 is an edge view of the same;

Fig. 16 is a rear view of the bracket for supporting this arm at the end, and

Figure 17:
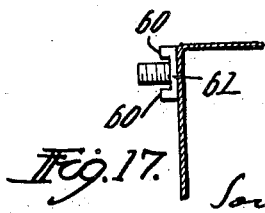

Fig. 17 is an end view of the same.

Referring to Fig. 1 it will be seen that the invention is illustrated in a form in which the automobile body represents a coupé construction but without any rumble seat or at least any that is capable of being utilized. In this case the main body 10 or frame is provided with a hinged element 11 which, in this adjustment, constitutes the back of the car and two other elements 12 and 13 which are hinged together, as will appear later, and constitute the top of the rear end. The element 11 is hinged to the body 10 at 14 near the top, the element 13 is hinged at 15 near the rear, and the elements 12 and 13 are hinged together at the point 16.

These three hinged elements are used as will be seen from comparison of Figs. 1, 5 and 6 in the following way. The element 11 is used either as the back or as a part of the top of the car. The element 13 is used either as the top in the coupé style or as a part of the back in the sedan style. The element 12 forms a part of the top in each case. A pair of straps 20 connect the elements 11 and 12 and are shown nearly in their most taut condition in Fig. 5.

This connection is a flexible one. These three elements are formed in the same way as the rest of the exterior part of the body and are provided with any desired kind of strengthening means in the form of cross members 17 and the like. It will be seen also that the forward or upper end of the member 13 is curved over along the line 18, so that it will just come within the hollow body 12 as they swing to and from the position shown in Fig. 5. A corresponding curve 19 is formed on the top or front end of the element 11. Thus the ordinary lines of the vehicle can be retained in both positions of these elements.

It is obvious, therefore, that these three elements constitute the principal feature of this invention and provide for the conversion of the car from one type to another. When they are in the position to form a sedan structure, a thumb screw 21 preferably is inserted to hold the two parts 11 and 12 together at the top as shown in Fig. 6. Before the body is collapsed to form the coupé style of car, this screw has to be removed. When they are in their final position for the coupé construction, this screw 21 is replaced in the position shown in Fig. 2 which is for the purpose of holding the elements 11 and 12 together as shown in Fig. 9. In this case the axis of the screw 21 is horizontal and it is located at the back of the two front seats 22 which have to be tipped forward in order to get at it. In the condition shown in Fig. 6, the screw is vertical and placed overhead.

It will be noticed that in addition to the front seats 22 which are tipped at 23 at their forward ends so as to get at the fastening screw 21, there is a rear seat 24 which is stationary and they are used only when the body is converted into the sedan type. This rear seat is provided with a movable back 25 hinged on the hinges 9. This back has an angular extension 26, the movements of which are controlled by a guide rod 27. As the back element 13 is raised, the seat back 25 is forced forward as shown in Fig. 6. When the element 13 is lowered the back 25 hangs down by gravity out of the way.

In order to prevent water or moisture from entering the car at any point through the joints formed by this hinged construction, I provide a series of gutters 40, 41 and 42, connected in different ways with the severed parts. The gutter 40 is fixed on the element 12 so as to be horizontal when this element is horizontal, that is, in both its final positions. In Fig. 6 this is shown as coming under the joint between this element and the element 13 and it is horizontal across the car to deliver the water at either side and so as to run down behind one of the windows 36.

The gutter 41 is fixed to the stationary roof of the body 10 and therefore is not movable. This is slanted to one side and delivers down through a pipe and discharges under the car. The gutter 42 is an integral part of the element 12 and of course, is horizontal in both of the positions of this part of the roof so that it will receive the water from the element 11 in the position shown in Fig. 6 and deliver it outside the window. In the closed position also it is in position to receive any water running down the rear surface of the element 11 and discharging it at the side. In each final position all three of these gutters serve the same purpose.

For the operation of these parts I have provided an operating shaft 30 having a square end 31 preferably for the reception of the ordinary starting crank or of course it can be arranged to be manipulated by any other kind of wrench or handle as desired. On this shaft is wound tightly a flexible connection 32, in this case shown on the left hand side of the car. By winding tightly I mean that as soon as the shaft begins to turn, this connection begins to wind up on it. It can be in the form of a metal chain, cord, or strap. It passes over an idler pulley 33 and is connected with a corresponding member 34 either flexible or otherwise which is connected with an arm 35 secured to the section 13 and projecting outwardly from it at the rear or bottom of the pivot hinge 15. It will be obvious that the rotation of this shaft in the proper direction will raise the rear section 13. I have provided on the shaft 30, in this case at the other end, a second flexible connection 37 which is loosely wound on the shaft, between a pair of flanges 39 to keep it in place. On that account, when the shaft first begins to turn, it simply tightens up the connection 37 and does not exert any pull upon it but, after the convolutions have been tightened up on the shaft, it will then commence to exert a positive pull on it which results in swinging the section 11 out toward and through the position shown in Fig. 5. The flexible connection 37 is connected with the end of an arm 38 positively fixed to the element 11 and projecting from beyond the pivot hinge 14 thereof. It is shorter than the arm 35.

It will be seen that the operation of the shaft 30 alone first pulls the parts 12 and 13 back about to the position shown in Fig. 5 and then starts to pull out the element 11 backwardly. The parts are so proportioned that the pull of these flexible connections will now continue to perform their work until the parts are brought to the position shown in Fig. 6. For this purpose it will be seen that the arm 38 is shorter than the arm 35 so it works faster after it finally starts. Eventually the elements 11, 12 and 13 all come to the position shown in Fig. 6 at the same time. Then the screw 21 is inserted and they are held there.

For the purpose of holding the shaft 30 in any position in which it may be desired to hold it, I provide a gravity latch 33, engaging a toothed wheel 34 fixed to the shaft 30. The latch has a handle 35 for manipulating it projecting out through a slot in the side of the casing.

In the sides of the casing, at the rear, are spaces for receiving two windows 36, which are operated by hand or in any desired way. They run in grooves, one on the element 13 and one on the upright part at the center of the body. These windows of course are concealed under the edges of the part 13 when the body is in the form shown in Fig. 1, in full lines, but when the car is converted into a sedan they are pulled up by hand and left closed or partly closed as may be desired, as indicated in Fig. 6. Preferably they have no operating means connected with any of the other features. They also serve as a means for bracing the top and keep the angles square.

It will be obvious that it is desirable to have a window through the element 11 to serve as a rear window when the vehicle is being used as a coupé and a window through element 13 to be used for the same purpose when used as a sedan.

I have provided these two openings 45 and 46. In Figs. 10, 11 and 12 is shown the construction of one of these. It is one feature of this invention to provide these openings in such form that when not in use as a rear window each one is closed and disguised both inside and outside, in such a way as to conceal as near as possible the fact that any window is there. For this purpose, I provide each of the two windows 45 and 46 with two shades 47 and 48 and one of them with a handle 49 for manipulating it. The shade 47 is at the front of the wall and the shade 48 is at the rear, next to the glass of the window. These shades are connected by cords, straps or the like 50, passing over rollers 51, two sets of straps being used to form an endless construction.

Now, when the handle is pushed or pulled the two shades are drawn together as indicated by the arrows in Fig. 12, or moved apart as may be desired. In one case the window is concealed both at the rear and at the front of the element or section in which it is located and in the other case, of course, the two shades are both open. When closed the rear shade is located next to the glass. In order to conceal the fact that there is shade present or any glass, it is colored like the outside of the body of the car. Thus when the car is being used as a coupé as shown in Fig. 1 the window in the element 11 is open and the window in the element 13 is closed and concealed as much as possible by its resemblance to the surface of the car.

When used as shown in Fig. 6 as a sedan, the window 46 is open and the window 45 in the roof is closed.

It will be noticed that at the rear of the car is a space 54 adapted to be used for luggage and the like. There is also an opening through the back, closed by a hinged door 55, through which the luggage can be introduced and removed. In order to support the spare rim 53 and tire at the back and still provide for the accessibility of the door 55 I provide the mechanism shown in Figs. 13 to 17. In these figures the disc wheel is shown as supported by an arm 56 secured to the center of the wheel by a nut 57 and secured on a stationary stud by a thumb nut 58. This arm 56 has notches 59 for receiving projections 60 on a plate 61, fixed in position. The thumb nut 58 is loosened to allow the arm 56 to be moved out of the range of the projections 60 and then the wheel can be dropped as shown in dotted lines in Fig. 13. This renders the door 55 readily accessible.

It will be seen that I provide for the ready conversion of an automobile from the coupé type to the sedan type by the manipulation of a member, namely the shaft 30; that I provide means for operating the parts which require no assistance on the part of the occupants except the mere turning of the shaft to change from one form to the other; that I provide means in a minimum number of parts for collecting any moisture that may seep through the necessary joints and directing it to one side and co-acting with each other for this purpose in whichever position the parts are placed; that I provide simple detachable means for positively holding the parts in either position and convenient means for bringing the back of the rear seat into proper place where it can be used in case the parts are moved into the sedan position.

The changing of the windows is simple without complications of any kind and also that I provide for ready accessibility to the door in the back of the rumble seat in spite of the presence of the spare wheel or rim.

Although I have illustrated and described only a single form of the invention, I am aware of the fact that modifications may be made therein by any person skilled in the art without departing from the scope of the invention as expressed in the claims. Therefore, I do not wish to be limited in these respects, but what I do claim is:—

1. In an automobile, the combination with a stationary part of the body, of three movable elements constituting the rear wall and top thereof, one of said elements being connected to a stationary part of the body and movable from a horizontal position to a vertical position, the second element being connected to a stationary part of the body near the top thereof and movable from a vertical position to a horizontal position, the third element being pivoted to the first, and a pair of straps flexibly connecting the third element to the second, the third element being arranged, when either of the other elements is in horizontal position, to lie in the same horizontal plane and constitute a continuation thereof all the way from one to the other.

2. In an automobile body, the combination with a stationary part of the body, of three movable elements constituting the walls and top thereof, two of said elements being pivoted to stationary parts of the body, the third element being pivoted to the first and flexibly connected to the second and adapted, when either of the other elements is in horizontal position, to lie in the same horizontal plane and constitute a continuation thereof, each of the first two elements having an edge in the form of a quarter round concentric with the pivots for permitting the turning of the elements about their pivots without leaving a space between said first two elements when they are in either extreme position.

3. In an automobile, the combination with a stationary part of the body, of three movable elements constituting the rear wall and top thereof, two of said elements being pivoted to the stationary parts of the body, the third element being pivoted to the first and flexibly connected to the second and adapted, when either of the other elements is in horizontal position, to lie in the same plane and constitute a continuation thereof, and a single fastening device adapted to be inserted into the middle section to secure it positively to the upper section when the parts are expanded and adapted to be secured through the bottom of the upper section into the middle section when the parts are contracted.

4. In an automobile, the combination with a body having front seats and rear seats, of a pivoted element located adjacent and a little to the rear of the rear seats and adapted to swing down to horizontal position over the rear seats to a form a coupé style body, said element being pivotally connected with the body and movable from a horizontal to a vertical position to convert the body into a sedan type, a back for the rear seats pivotally depending from the pivoted element and means for guiding the back to move into proper relation with the rear seat when the pivotal element is in vertical position.

In testimony whereof I have hereunto affixed my signature.

WILFRED DUPRÉ.